United States Patent
Willis et al.

(10) Patent No.: US 9,396,346 B2
(45) Date of Patent: Jul. 19, 2016

(54) SYSTEM AND METHOD FOR ACCESSING AND UPDATING SECURED DATA

(71) Applicants: BlackBerry Limited, Waterloo (CA); 2236008 Ontario Inc., Waterloo (CA)

(72) Inventors: Edward Snow Willis, Ottawa (CA); Jean-Philippe Lespinasse, Brossard (CA); Francois Leroux, Candiac (CA); Jasvir Jhaj, Brampton (CA); Praveena Asokan, Mississauga (CA); Earl John Wikkerink, Waterloo (CA); Alan Edward Falloon, Beckwith (CA); Alan Geue, Ottawa (CA); David Alan Inglis, Ottawa (CA); Benton Hei Wah Lam, Ottawa (CA); Christopher Scott Travers, Ottawa (CA); Adrian Michael Logan, Waterloo (CA); John William Cassidy, Ottawa (CA)

(73) Assignees: BlackBerry Limited, Waterloo (CA); 2236008 Ontario Inc., Waterloo (CA)

( * ) Notice: Subject to any disclaimer, the term of this patent is extended or adjusted under 35 U.S.C. 154(b) by 103 days.

(21) Appl. No.: 14/302,541

(22) Filed: Jun. 12, 2014

(65) Prior Publication Data

US 2015/0363602 A1    Dec. 17, 2015

(51) Int. Cl.
*G06F 17/30* (2006.01)
*G06F 21/62* (2013.01)
*G06F 21/53* (2013.01)

(52) U.S. Cl.
CPC ............... *G06F 21/62* (2013.01); *G06F 21/53* (2013.01); *G06F 21/6218* (2013.01); *G06F 21/6281* (2013.01); *G06F 2221/2107* (2013.01); *G06F 2221/2113* (2013.01); *G06F 2221/2149* (2013.01)

(58) Field of Classification Search
CPC .............. G06F 21/10; G11B 20/00086; G11B 20/0021; H04L 63/0428; H04N 21/4405
USPC .......................................................... 726/26
See application file for complete search history.

(56) References Cited

U.S. PATENT DOCUMENTS

| | | | |
|---|---|---|---|
| 2012/0079423 A1* | 3/2012 | Bender | G06F 9/44505 715/804 |
| 2014/0007263 A1* | 1/2014 | Altman | G06F 21/60 726/30 |
| 2014/0379695 A1* | 12/2014 | Waters | G06F 17/30106 707/722 |

FOREIGN PATENT DOCUMENTS

EP          2680179 A1       1/2014

OTHER PUBLICATIONS

Extended European Search Report; EP 15171513.3; Oct. 16, 2015.
Z. Cliffe Schreuders et al. "The state of the art of application restrictions and sandboxes: A survey of application-oriented access controls and their shortfalls", Computers and Security, vol. 32, Feb. 1, 2013.

* cited by examiner

*Primary Examiner* — Baotran N To
(74) *Attorney, Agent, or Firm* — Ridout and Maybee LLP

(57) ABSTRACT

A method is provided for use on an electronic device having a display, a communication component, a memory, and a processor coupled to the display, the communication component, and the memory. The memory stores data in a first sandbox and data in a second sandbox, the first sandbox being a secure sandbox and having a shadow data component, the shadow data component storing a subset of the data stored in the first sandbox. The method comprises, in response to a request, providing the data stored in the first sandbox when the first sandbox is in an unlocked mode and providing the data stored in the shadow data component when the first sandbox is in a locked mode.

19 Claims, 3 Drawing Sheets

SYSTEM AND METHOD FOR ACCESSING AND UPDATING SECURED DATA

TECHNICAL FIELD

The present application relates to electronic device security and, more particularly, to the security of files on electronic devices that may be used in different operational contexts.

BACKGROUND

Users sometimes carry more than one electronic device so that they may use different electronic devices for different aspects of their lives. For example, they may carry both a personal electronic device for personal use and a work-issued electronic device for work-related use. Carrying multiple electronic devices which have overlapping capabilities is inefficient. Thus, users may wish to be able to use a single electronic device for both personal and work purposes.

Employers may also benefit when employees are permitted to use a single electronic device for both personal and work purposes. For example, when employees connect their personal electronic device to work-related systems, the personal electronic device may then be used for work purposes, allowing the employer to benefit from increased productivity associated with the use of the electronic device without having to finance the purchase of the electronic device. Thus, shared electronic devices may be advantageous for both employees and employers. However, employers are often concerned about maintaining the integrity and security of work-related files when allowing electronic devices to be used for both work and personal purposes.

Sandbox techniques have been used to allow electronic devices to be used in different operational contexts. Sandboxing maintains a strict separation between business and personal data and applications. Conventionally, such techniques require manual selection and switching between the different operating contexts.

BRIEF DESCRIPTION OF THE DRAWINGS

Reference will now be made, by way of example, to the accompanying drawings which show example embodiments of the present application, and in which.

Like reference numerals are used in the drawings to denote like elements and features.

DETAILED DESCRIPTION

Figure 1:
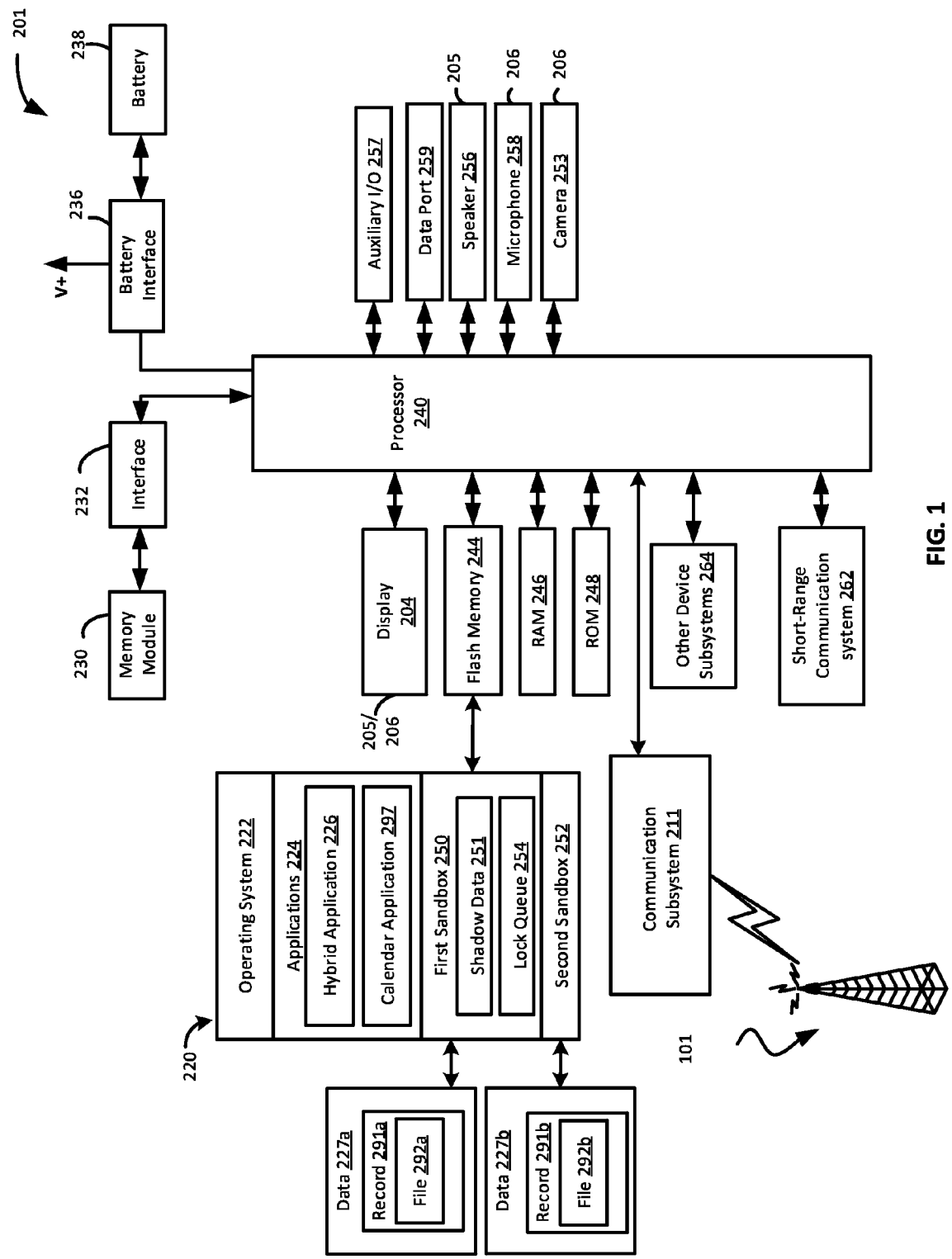
FIG. 1 is a block diagram illustrating an example electronic device in accordance with example embodiments of the present disclosure.

One aspect of the present application describes an electronic device comprising a display, a communication component, a memory storing data in a first sandbox and data in a second sandbox, the first sandbox being a secure sandbox and having a shadow data component, the shadow data component storing a subset of the data stored in the first sandbox, and a processor coupled to the display, the communication component, and the memory. The processor is configured to, in response to a request, provide the data stored in the first sandbox when the first sandbox is in an unlocked mode and provide the data stored in the shadow data component when the first sandbox is in a locked mode.

The processor may be further configured to receive from a server via the communication component information for updating the data stored in the first sandbox, update the data stored in the first sandbox when the first sandbox is in the unlocked mode, and update the data stored in the shadow component The processor may be further configured to receive from a server via the communication component information for updating the data stored in the first sandbox, store the information for updating the data stored in the first sandbox in a queue when the first sandbox is in the locked mode, and update the data stored in the shadow data component.

The processor may be further configured to update the data stored in the first sandbox based on the information for updating the data stored in the first sandbox stored in the queue when the first sandbox enters the unlocked mode.

Another aspect of the present application provides a method for use on an electronic device having a display, a communication component, a memory storing data in a first sandbox and data in a second sandbox, the first sandbox being a secure sandbox and having a shadow data component, the shadow data component storing a subset of the data stored in the first sandbox, and a processor coupled to the display, the communication component, and the memory. The method comprises, in response to a request, providing the data stored in the first sandbox when the first sandbox is in an unlocked mode and providing the data stored in the shadow data component when the first sandbox is in a locked mode.

Yet another aspect of the present application provides a computer program product comprising a computer readable medium having stored thereon computer executable instructions that when executed by a computer perform a method for use on the computer having a display, a communication component, a memory storing data in a first sandbox and data in a second sandbox, the first sandbox being a secure sandbox and having a shadow data component, the shadow data component storing a subset of the data stored in the first sandbox, and a processor coupled to the display, the communication component, and the memory. The method comprises in response to a request, providing the data stored in the first sandbox when the first sandbox is in an unlocked mode and providing the data stored in the shadow data component when the first sandbox is in a locked mode.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Reference is first made to FIG. 1 which illustrates an example electronic device 201. In the illustrated example embodiment, the electronic device 201 is a communication device, such as a mobile communication device. In at least some example embodiments, the electronic device 201 is a two-way communication device having data and voice communication capabilities, and the capability to communicate with other computer systems, for example, via the Internet.

Depending on the functionality provided by the electronic device 201, in various example embodiments the electronic device 201 may be a multiple-mode communication device configured for data and voice communication, a mobile telephone such as a smart phone, a tablet computer such as a slate computer, an electronic book reader, a wearable computer such as a watch, a PDA (personal digital assistant), a laptop computer system, a desktop computer system, automobile computing system, or any other type of suitable computer system.

A smartphone is a mobile phone which offers more advanced computing capabilities than a basic non-smartphone cellular phone. For example, a smartphone may have an ability to run third party applications which are stored on the smartphone.

A tablet computer (which may also be referred to as a tablet) is an electronic device 201 which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a diagonal length that is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

In at least some embodiments, the electronic device 201 is a handheld electronic device. A handheld electronic device is an electronic device 201 which is sufficiently small to be held in one or more hands of a user. The term handheld electronic device includes smartphones and may also include tablet computers. In at least some embodiments, the handheld electronic device may be sufficiently small to be held in a single hand of a user. For example, the handheld electronic device may be a palm-sized device which is sized to be held in the palm of a user's hand. From the description which follows, it will be appreciated that the techniques and methods described herein may be used in electronic devices 201 having limited display capabilities.

In other example embodiments, the electronic device 201 may be of a type not specifically listed above.

The electronic device 201 includes a housing (not shown) which houses components of the electronic device 201. The internal components of the electronic device 201 are constructed on a printed circuit board (PCB). The electronic device 201 includes a controller including at least one processor 240 (such as a microprocessor) which controls the overall operation of the electronic device 201. The processor 240 interacts with device subsystems, such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, a camera 253, one or more microphones 258, and/or a touch-sensitive overlay associated with a touchscreen display, etc.), flash memory 244, random access memory (RAM) 246, read only memory (ROM) 248, auxiliary input/output (I/O) subsystems 257, a data port 259 (which may be a serial data port, such as a Universal Serial Bus (USB) data port), one or more output interfaces 205 (such as a display 204, one or more speakers 256, or other output interfaces), a short-range communication subsystem 262, and other device subsystems generally designated as 264. Some of the subsystems shown in FIG. 1 perform communication-related functions, whereas other subsystems may provide "resident" or on-device functions.

One or more of the input interfaces 206 may be configured for receiving user input to allow a user to interact with the electronic device 201. Such input interfaces 206 may, for example, allow a user to interact with a graphical user interface provided on the electronic device 201. Instructions, commands, or other forms of input may be received by the electronic device 201 via the input interfaces. For example, the input interfaces 206 may allow a user to interact with one or more interface elements displayed on a graphical user interface of the display 204.

Such input interfaces 206 may take a variety of forms. For example, any one or combination of the following input interfaces 206 may be included on the electronic device 201 and used for receiving user input: a touchscreen display (which may be used, for example, to detect gesture-based input), a control button, a trackball, trackpad, or optical input device, a keyboard, a camera 253 (which may be used, for example, to detect gesture-based input), an orientation or acceleration sensor such as an accelerometer (which may be used, for example, to detect gesture-based input performed by moving the electronic device 201), and/or a microphone 258 (which may be used, for example, to detect voice-based commands). It will be appreciated that the foregoing list of input interfaces 206 is not exhaustive and that other input interfaces 206 may be used instead of or in addition to any of the interfaces 206 described above.

As noted previously, the electronic device 201 may include a touch-sensitive display 204 which may be referred to as a touchscreen or a touchscreen display 204. The touchscreen display 204 may be constructed using a touch-sensitive input surface connected to an electronic controller. The touch-sensitive input surface overlays the touchscreen display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display 204 acts as both an input interface 206 and an output interface 205.

In some embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed.

In some example embodiments, the auxiliary input/output (I/O) subsystems 257 may include an external communication link or interface, for example, an Ethernet connection. The electronic device 201 may include other wireless communication interfaces for communicating with other types of wireless networks, for example, a wireless network such as an orthogonal frequency division multiplexed (OFDM) network.

In the example embodiment illustrated, the electronic device 201 also includes a memory module 230 (which may be flash memory) and a memory module interface 232. The memory module 230 may be removable from the electronic device 201. Network access may be associated with a subscriber or user of the electronic device 201 via the memory module 230, which may be a Subscriber Identity Module (SIM) card for use in a GSM network or other type of memory module for use in the relevant wireless network. The memory module 230 may be inserted in or connected to the memory module interface 232 of the electronic device 201.

The electronic device 201 may store data 227a, 227b in an erasable persistent memory, which in one example embodiment is the flash memory 244. In various example embodiments, the data 227a, 227b may include service data having information required by the electronic device 201 to establish and maintain communication with the wireless network 101. The data 227a, 227b may also include user application data including one or more records 291a, 291b. The records 291a, 291b may, for example, include email messages, address book and contact information, calendar and schedule information, notepad documents, image files, and other commonly stored user information stored on the electronic device 201 by its user, and other data.

The data 227a, 227b stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the memory of the electronic device 201.

At least some of the records 291a, 291b may include an attachment 292a, 292b. By way of example, in some embodiments, a record 291a, 291b may be an email message (or another type of electronic message) that includes a file as an attachment 292a, 292b. Electronic messages sometimes include attachments 292a, 292b to allow files to be transferred from one location, person, device, or account to another location, person, device or account.

By way of further example, a record 291a, 292b may be a calendar entry that includes a file as an attachment 292a, 292b. Calendar entries may, for example, include attachments 292a, 292b representing data related to an event associated with the calendar entry. For example, content (such as a presentation, document or notes) may be included in the calendar entry to allow such content to be discussed when the event represented by the calendar entry occurs. For example, the attachment 292a, 292b may be an agenda for a meeting. By way of further example, an attachment 292a, 292b included in a calendar entry may represent transportation information related to a calendar entry; for example, directions to the event.

Accordingly, records 291a, 291b associated with the electronic device 201 may include one or more attachments 292a, 292b. An attachment 292a, 292b may represent content or may link to such content (for example, the attachment may provide a link to online content e.g., it may be a Uniform Resource Locator (URL)).

Files and non-hybrid applications that access the files can be classified according to a workspace in which the files and/or applications are restricted. The workspace can be one of a plurality of partitioned workspaces in which each workspace is separate from each of the other workspaces such that a tightly-controlled set of resources for controlling entities such as, but not limited to, data files, network connections and hardware and running applications that access the entities provides a security mechanism for separating the launching and running of programs and entities in the different workspaces. Each workspace is generally referred to as a sandbox 250, 252 and may also be referred to as a perimeter. Rule sets can be implemented to provide full control over what processes are started, spawned (by other applications), allowed to access entities such as, but not limited to, data files, network connections, and hardware, or allowed to inject code into other applications. Sandboxing provides a security system where data is prevented from movement between the different areas. More specifically, sandboxes 250, 252 (and other components, and software on the electronic device 201) may be configured such that data is prevented from being moved between different sandboxes 250, 252.

The sandboxes 250, 252 generally allow the electronic device 201 to be used in different operational contexts while maintaining file security. For example, the electronic device 201 may be used for both personal use and also for business use. Business files may, however, be kept separately from personal files (e.g. business files may be kept in a corporate sandbox and personal files may be kept in a personal sandbox and the sandboxes may be walled off from one another so that file transfers between the sandboxes are prevented or controlled).

Accordingly, in at least some embodiments, there can be multiple modes or workspaces provided by the electronic device 201. A non-hybrid application running in one sandbox 250, 252 can access entities such as, but not limited to, data files, network connections, and hardware in the sandbox 250, 252 in which it is running, but may be restricted from accessing and operating on entities such as, but not limited to, data files, network connections, and hardware in another sandbox.

Different data 227a, 227b may be securely separated in different sandboxes 250, 252, though a non-hybrid application that may separately operate on the different data 227a, 227b in the different sandboxes without accessing data 227a, 227b in another sandbox 250, 252. Thus, associated with using a single user interface for multiple sandboxes is an issue as to which sandbox a non-hybrid application is to be launched. This issue arises because it is generally at a data or file level that some resource is flagged as falling into, or being restricted to, a particular sandbox 250, 252. For example, the system may be partitioned into two workspaces (as secure workspaces, i.e., sandboxes) such as a corporate sandbox and a personal sandbox. The data and files in the corporate sandbox can be strictly separated from non-hybrid applications or programs running the personal sandbox. This secure separation provides a security mechanism that allows a system to operate in numerous modes. The establishment of a secure separation to provide a security mechanism that allows a system to operate in numerous modes is not limited to two sandboxes and can be implemented for three or more sandboxes.

Accordingly, as illustrated in FIG. 1, the memory may be partitioned into a plurality of sandboxes 250, 252. In the embodiment illustrated, the memory is partitioned into a first sandbox 250 and a second sandbox 252. Each sandbox 250, 252 may be associated with separate data 227a, 227b. More particularly, each sandbox 250, 252 may be associated with a different record 291a, 291b or set of records. For example, in the example illustrated, the first sandbox 250 stores a first record 291a having a first attachment 292a and the second sandbox 252 stores a second record 291b having a second attachment 292b. For example, in at least some embodiments, one of the sandboxes 250, 252 may be associated with business records (e.g. it may be a corporate sandbox) and one of the sandboxes 250, 252 may be associated with personal records (e.g. it may be a personal sandbox).

In one example, the sandbox 250 may be a corporate sandbox and may be encrypted and require password authentication to access, with a timeout feature operating on the password authentication security mechanism. The sandbox 252 may be a personal sandbox and may have any level of security applied, but generally a lower level of security than the corporate sandbox 250. Throughout the remainder of the application the first sandbox 250 may be referred to as a corporate sandbox 250 and the second sandbox 252 may be referred to as a personal sandbox 252, however this is only provided as an example for the reader to understand the present application.

For example, the corporate sandbox 250 may become locked and require password authentication for access after a relatively low period of device inactivity, such as 3 minutes, whereas the personal sandbox 252 may remain unlocked for a longer period of time, such as 30 minutes or even an hour.

Additionally, in one example, data stored in the corporate sandbox 250 may be encrypted, while data stored in the personal sandbox 252 may not necessarily be encrypted, or may be encrypted with a lower level of encryption.

The corporate sandbox 250 may further include shadow data 251. When the corporate sandbox is password locked (e.g., because a user has not used the device for a predetermined amount of time resulting in an automatic locked mode for the corporate sandbox 250), the corporate sandbox 250 may be fully locked and not accessible to any application running on the wireless device 201. The shadow data 251 may be a redundant subset of the data stored in the corporate sandbox 250. In other words, the shadow data 251 may maintain a copy of some records, such as the record 291a, or portions of some of the records that reside in the corporate sandbox 250, which are permitted to be accessed even when the corporate sandbox is in a locked mode.

Further, the corporate sandbox 250 may include a lock queue 254, which may be used for storing updates to records, such as the record 291a, or new records for storage in the corporate sandbox 250, that arrive for updating data in the corporate sandbox 250 when the corporate sandbox 250 is in a locked mode. For example, an exchange with an email server may occur when the corporate sandbox 250 is locked and new corporate email may be retrieved from the server. The new corporate email may be stored in the lock queue 254 until the corporate sandbox 250 is unlocked. Operation of the shadow data 251 and lock queue 254 will be described in more detail below in connection with FIGS. 2-4.

The data port 259 may be used for synchronization with a user's host computer system (not shown). The data port 259 enables a user to set preferences through an external device or software application and extends the capabilities of the electronic device 201 by providing for information or software downloads to the electronic device 201 other than through the wireless network 101. The alternate download path may, for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects his electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 includes or is connectable to a power source. In the embodiment illustrated, the power source is a battery 238, such as a rechargeable battery that may be charged, for example, through charging circuitry coupled to a battery interface 236 such as the serial data port 259. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A pre-determined set of applications that controls basic device operations, including data and possibly voice communication applications, may be installed on the electronic device 201 during or after manufacture. Additional applications and/or upgrades to an operating system 222 or software applications 224 may also be loaded onto the electronic device 201 through the wireless network 101, the auxiliary I/O subsystem 257, the data port 259, the short-range communication subsystem 262, or other suitable device subsystems 264. The downloaded programs or code modules may be permanently installed, for example, written into the program memory (i.e. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by the email messaging application and output to the touch screen display 204. A user of the electronic device 201 may also compose data items, such as email messages, for example, using the input interfaces 206, such as the touch screen display 204. These composed items may be transmitted through the communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output is typically accomplished primarily through the speaker 256, the touchscreen display 204 may also be used to provide an indication of the identity of a calling party, duration of a voice call, or other voice call related information.

The processor 240 operates under stored program control and executes software modules 220 stored in memory such as persistent memory, for example, in the flash memory 244. As illustrated in FIG. 1, the software modules 220 include operating system software 222 and software applications 224, such as a calendar application 297.

A hybrid application is a trusted application that is capable of and permitted to concurrently access files from more than one sandbox 250, 252. That is, the hybrid application is permitted to access data from a plurality of sandboxes 250, 252 within a single instance of the hybrid application. The hybrid application may access files from a sandbox 250, 252 in which the hybrid application was initiated and may also access files from another sandbox 250, 252. The ability to access files from a plurality of sandboxes 250, 252 at the same time may be provided to the hybrid application by higher-level system components, such as a sandbox management application or module (not shown) which manages the sandboxes 250, 252 and administers a set of access rules for the sandboxes. The sandbox management application or module may, for example, be provided by the operating system 222.

Accordingly, a hybrid record access application 226 may be provided on the electronic device 201. The hybrid record access application 226 is an application that is configured and permitted to access records 291a, 291b associated with a plurality of sandboxes 250, 252. For example, the hybrid record access application 226 is an application that is configured to access records 291a from a first sandbox 250 and to concurrently access records 291b from a second sandbox 252. More particularly, a single instance of the hybrid record access application 226 may access records 291a, 291b from both the first and second sandbox 250, 252 concurrently.

In some embodiments, the hybrid record application 226 may be an electronic messaging application, such as an email application. In such embodiments, the electronic messaging application may be configured to access records 291a, 291b that are electronic messages, such as email messages. The electronic messaging application may provide for the creation of electronic messages, the display of electronic messages (such as received electronic message), composing and sending replies to electronic messages, forwarding electronic messages and/or other functions associated with electronic messages not specifically listed herein. The hybrid record application 226 may be permitted to concurrently access electronic messages associated with a plurality of sandboxes 250, 252, as long as neither sandbox is currently locked. One or more of these electronic messages may have an attachment 292a, 292b associated therewith. For example, an email message may include an attachment.

The electronic messaging application may be configured for use with other types of electronic messages instead of or in addition to email messages. For example, in at least some embodiments, the electronic messaging application may be configured for sending and/or receiving text messages (such as short message service (SMS) messages), instant messages and/or social networking messages (i.e. electronic messages which may be transmitted via a social networking service such as Facebook™ or Linkedin™). In at least some embodiments, the electronic messaging application may be a unified messaging application that is configured to access different types of messages from a common interface.

The electronic messaging application may be configured to operate in at least one operating mode in which electronic messages associated with a plurality of sandboxes are displayed concurrently. For example, in one operating mode, the hybrid electronic messaging application may display a list that includes references to electronic messages associated with a plurality of sandboxes 250, 252. Such a list may be referred to as an integrated record list. The hybrid electronic messaging application may allow an electronic message to be selected from the list. Such selection may cause the electronic message to be displayed more fully. In at least some embodiments, when the electronic message is displayed more fully, a selectable option to access an attachment 292a, 292b associated with the electronic message may be displayed. Activation of the selectable option may cause an attachment access application to be initiated.

In some embodiments, the hybrid record application 226 may be a calendar application, such as the calendar application 297. The calendar application 297 is an application that is configured to display dates and days of the week. The calendar application 297 may be configured to access records 291a, 291b such as calendar entries. Calendar entries are records that are associated with the calendar and that have timing information specifying when the events associated with such calendar entries are to occur. For example, calendar entries may specify a date and/or time associated with an event. By way of example and not limitation, the event may be a meeting.

When the calendar application 297 is a hybrid application, it may concurrently access calendar entries associated with a plurality of sandboxes 250, 252. For example, the calendar application 297 may, in some embodiments, display a hybrid calendar which includes calendar entries from a first sandbox 250 and also calendar entries from a second sandbox 252, so long as neither sandbox is currently locked. In one example, when one sandbox such as the corporate sandbox 250 is currently locked, a hybrid application such as the calendar application 297 may still have limited access to the data 227a through the shadow data component 251. For example, the shadow data component 251 may include copies of calendar entries that show the time and place of each calendar entry so that the user can still get a bird's eye view of his calendar for the day without having to unlock the corporate sandbox 250. One or more of these calendar entries may have an attachment 292a, 292b associated therewith.

The hybrid calendar application 297 may allow a calendar entry to be selected from an at-a-glance display and/or from a reminder interface. The at-a-glance display may provide an overview of calendar entries associated with a particular time period, such as a day, week or month, and the at-a-glance display may be operable with data stored in the shadow data component 251 when the corporate sandbox 250 is locked. A reminder interface may be a display screen that reminds a user of upcoming calendar entries. That is, the reminder interface may act as an alarm for the calendar entries and may be operable with data stored in the shadow data component 251 when the corporate sandbox 250 is locked. Selection of a calendar entry from the at-a-glance display or from the reminder interface may cause the calendar entry to be displayed more fully, but may require unlocking the corporate sandbox 250 if the corporate sandbox 250 is locked and if the meeting the user wishes to view is stored in the corporate sandbox 250. In at least some embodiments, when the calendar entry is displayed more fully, the user may then be required to unlock the corporate sandbox 250 before viewing more detail from the calendar entry. A selectable option to access an attachment 292a, 292b associated with the calendar entry may be displayed. Activation of the selectable option may cause the attachment access application to be initiated.

In other words, the electronic device 201 may display an update on the display 204 using the data stored in the shadow data component 251 when the first sandbox 250 is in the locked mode. The update may include a calendar reminder, an email notification, or a contact list entry, for example indicating an incoming phone call.

Each of the software applications 224 may include layout information defining the placement of particular fields and graphic elements (e.g. text fields, input fields, icons, etc.) in the user interface (i.e. the touchscreen display 204) according to the application. In at least some example embodiments, the software applications 224 may include pre-determined gesture information defining functionalities associated with the pre-determined gestures received via the touchscreen display 204. For example, a software application 224 may determine a finger swiping movement (i.e. a pre-determined gesture) on the touchscreen display 204 as a scrolling function.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Example Method for Accessing and Updating Secured Data

A sandbox is distinct from a virtual machine. A virtual machine generally refers to a virtual instantiation of an operating system. For example, a personal computer may be running a Windows operating system and may also be running a virtual Mac operating system using a virtual machine. A virtual machine can also be implemented for specific processes so that a virtual machine can be used on a host operating system to run only a specific process. Those skilled in the relevant arts will appreciate that the use of virtual machines differs from the sandboxes 250, 252 described in the present application in that the sandboxes are implemented on a single operating system, without using virtual machines. While some aspects of the method described herein is equally applicable to an application using virtual machines, the sandboxes 250, 252, described herein, are not virtual machines and the sandboxes 250, 252, as described herein, are technically distinct from virtual machines.

In at least some embodiments, the electronic device 201 may be configured to provide a corporate sandbox 250 associated with work-related records and a personal sandbox 252 associated with personal records. In at least some embodiments records associated with the personal sandbox 252 may be displayed while records associated with the corporate sandbox 250 may be prevented from being displayed when the corporate sandbox 250 is in a locked mode. However, it may be desirable to provide some access to a subset of the date stored in the corporate sandbox 250 even when the corporate sandbox 250 is locked, for example to provide notifications to a user of the wireless device 102 of upcoming calendar appointments, incoming emails, etc., that are stored in the corporate sandbox 250 while maintaining the absolutely security of the corporate sandbox 250.

In one example, the shadow data component 251 aims to serve this purpose, by storing a subset of the data stored in the corporate sandbox 250 that is accessible even when the corporate sandbox 250 is in the locked mode. In one example, the subset of data stored in the shadow data component 251 may be a redundant subset of the data stored in the corporate sandbox 250. The subset of the data stored in the shadow data component 251 may be a subset of the data of the corporate sandbox 250 that does not compromise the security of the data. For example, the shadow data component 251 may store only the time and perhaps a place of the appointments in a user's calendar, but not necessarily the specific place or people with whom the user is meeting. In another example, the shadow data component 251 may store limited information from a user's contacts, such as only names and images of contacts, so that when an incoming phone call arrives from a contact stored in the corporate sandbox 250 when the corporate sandbox 250 is locked, the user receiving the call can still see who the call is from. While some examples of suitable subsets of the data stored in the corporate sandbox 250 for storing in the shadow data component 251 are provided, any suitable subset can be chosen to meet the design criteria and security needs of a particular application.

In one aspect, the present application may provide for partitioning of enterprise data into source and shadow sets, where the source set refers to the enterprise data in total (e.g., the corporate sandbox 250, which may also be referred to as a work perimeter or enterprise sandbox) and the shadow set (e.g., the shadow data component 251) refers to a slice of that enterprise data that the enterprise is willing to have accessible when the corporate sandbox 250 is locked. In one example, the present application arranges for the shadow data component 251 to be updated via normal synchronization operations with a mail server even when the corporate sandbox 250 is inaccessible due to a security lock. The security lock may be disengaged and the corporate sandbox 250 may be unlocked when the user of the wireless device 201 provides required security authentication, such as an input password, facial recognition by the wireless device 102 using a camera such as the camera 253, thumbprint authentication, or any other suitable method of user authentication. The ability to update the shadow data component 251 while the corporate sandbox 250 is locked does not compromise the security of the corporate sandbox 250 and, in one example, the locked corporate sandbox 250 is not modified by this operation.

When the corporate sandbox 250 is unlocked, the corporate sandbox 250 is updated and the previously revised data in the shadow data component 251 is made consistent with the changes to be made to the corporate sandbox 250.

In one example, two sets of data are defined (e.g., the corporate sandbox 250 and the shadow data component 251), with each being managing in separate databases. For example, the corporate sandbox 250 may be lockable, which in one example may mean the corporate sandbox 250 is completely inaccessible while locked, while the shadow data component 251 may be saved in the start-up domain of the corporate sandbox 250 such that the shadow data component 251 remains accessible while the corporate sandbox 250 is locked. Changes to the corporate sandbox 250 (e.g., from incoming data from a mail server or by user input) may result in the relevant slice of data being updated in the shadow data component 251, while the changes for the corporate sandbox 250 may be saved in a queue until the corporate sandbox 250 becomes unlocked.

In one example, the correspondence of one piece of data from the corporate sandbox 250 to the same piece of data stored in the shadow data component 251 is managed by retaining an identifier from the corporate sandbox 250 in the record stored in the shadow data component 251. In one example, the identifier may be referred to as a source primary key value, or a first key.

In one example, when the corporate sandbox 250 is unlocked (e.g., typically when a user of the wireless device 102 is using the wireless device 102) and updates for data stored in the corporate sandbox 250 arrive at the wireless device 102 (e.g., provided by a mail server during a sync operation), both the corporate sandbox 250 and the shadow data component 251 may be updated.

However, when the corporate sandbox 250 is locked and updates for data stored in the corporate sandbox 250 arrive at the wireless device 102, the data changes (e.g., provided by a mail server during a sync operation) may be saved to a queue, such as the lock queue 254, and the shadow data component 251 may also be updated. In one example, when the corporate sandbox 250 is locked, the shadow data component 251 entries may be based on a second key, which may be a unique identifier provided by the mail server. Based on the second key, if the entry exists in the shadow data component 251, the entry is updated and if the entry does not exist, a new entry is created. When the corporate sandbox 250 becomes unlocked, the data stored in the lock queue 254 is used to update the corporate sandbox 250, at which point the correspondence between the entries in the shadow data component 251 and the corporate sandbox 250 is determined by the second key if no first key entry is present in the shadow data component 251 record, otherwise the first key is used.

In other words, an element of data that is stored in both the first sandbox 250 and the shadow data component 251 may be associated by a first key (e.g., an identifier) and an element of data that is stored in both the queue 254 and the shadow data component 251 may be associated by a second key (e.g., an identifier).

Figure 2:
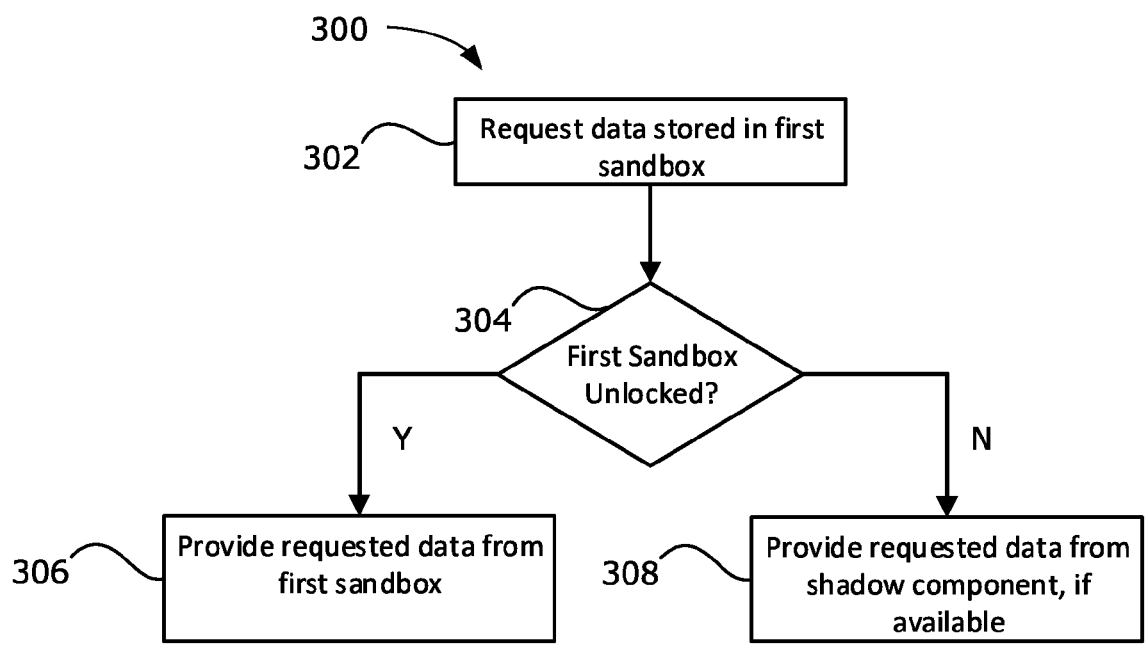
FIG. 2 illustrates a flowchart of an example method of accessing secure data from a secure sandbox when the sandbox is locked or unlocked.

Referring now to FIG. 2, a flowchart is shown illustrating an example method 300 of accessing secure data from a secure sandbox when the sandbox is locked or unlocked. In one example, the method 300 may be executed by an electronic 201 device having a display 204, a communication component such as the communication subsystem 211, and a memory 244 storing data in a first sandbox 250 and data in a second sandbox 252. The first sandbox 250 may be a secure sandbox having a shadow data component 251 and the shadow data component 251 may store a subset of the data stored in the first sandbox 250. The processor 240 may be coupled to the display 204, the communication component, and the memory 244. While one example of an electronic device 201 is provided for executing the method 300, any suitable computing device may be used to meet the design criteria of a particular application.

At a first block 302, a request may be made for data stored in the first sandbox 250. For example, the user of the electronic device 201 may be using the electronic device 201, and may enter an application 224 such the calendar application 297 or an email application and try to view a calendar entry or an email. Either the calendar application or the email application running on the wireless device 102 may make a request, for example to the operating system 222, to receive relevant data stored in the first sandbox 250.

Next, at a block 304, the operating system 222 may determine whether the first sandbox 250 is currently in a locked mode or an unlocked mode.

When the sandbox 250 is in an unlocked mode, the operating system 222 may retrieve the requested data stored in the first sandbox 250 and provide the requested data to the application 224 at a block 306.

However, when the sandbox 250 is in a locked mode, the operating system 222 may retrieve data stored in the shadow data component 251 and provide the data to the application 224 at a block 308. The data stored in the shadow data component 251 may be a subset of the requested data requested by the application 224. For example, the data stored in the shadow data component 251 may be a portion of the data stored in the sandbox 250 that is determined to be acceptable for insecure viewing. For example, whereas the sandbox 250 may contain all relevant information for a calendar appointment, the shadow data component 251 may store only basic details about the appointment, such as the time of the appointment, and optionally the location of the appointment. Viewing any more information about the appointment may require the user to enter his password in order to place the sandbox 250 in an unlocked mode. In another example, whereas the sandbox 250 may contain all relevant information for an email that the user is trying to view, the shadow data component 251 may store only basic details about the email, such as the time of arrival of the email, who the email is from, and whether the email is flagged as high priority. Viewing any more information about the email such as the content of the email may require the user to enter his password in order to place the sandbox 250 in an unlocked mode.

Figure 3:
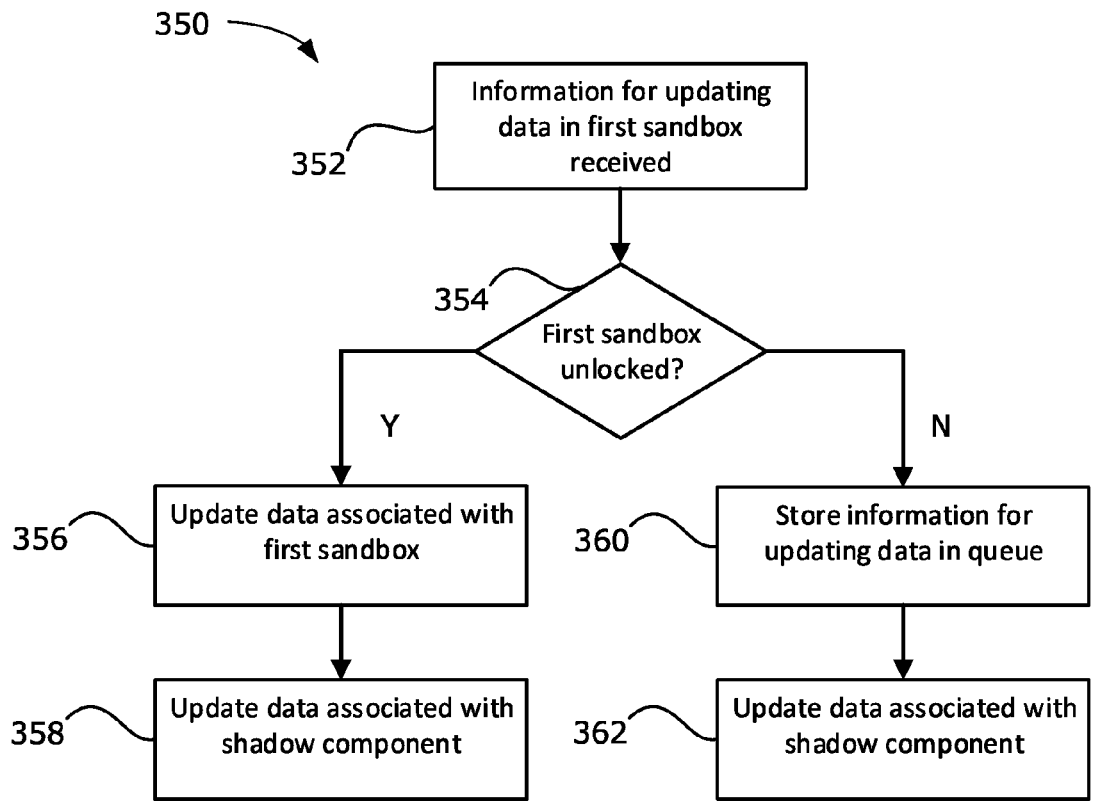
FIG. 3 illustrates a flowchart of an example method of updating data in a secure sandbox when the sandbox is locked or unlocked.

Referring next to FIG. 3, a flowchart of an example method 350 of updating data in a secure sandbox when the sandbox is locked or unlocked is shown. In one example, the method 300 may be executed by an electronic 201 device having a display 204, a communication component such as the communication subsystem 211, and a memory 244 storing data in a first sandbox 250 and data in a second sandbox 252. The first sandbox 250 may be a secure sandbox having a shadow data component 251 and the shadow data component 251 may store a subset of the data stored in the first sandbox 250. The processor 240 may be coupled to the display 204, the communication component, and the memory 244. While one example of an electronic device 201 is provided for executing the method 350, any suitable computing device may be used to meet the design criteria of a particular application.

At a first block 352, information for updating data stored in the first sandbox 250 may be received. In one example, the information for updating the data stored in the first sandbox 250 may be received from a server via a communication component such as the communication subsystem 211, such as an email server attempting to synchronize a user's email data on the electronic device 201 with the email server. In another example, the user could be viewing information on the display 204 of the electronic device 201 and may provide input to the electronic device 201 to change data, such as by moving a calendar appointment to a new time. In one example, the request to update the data stored in the first sandbox 250 may be handled by the operating system 222.

Next, at a block 354, the operating system 222 may determine whether the first sandbox 250 is currently in a locked or unlocked mode.

When the first sandbox 250 is in an unlocked mode, the operating system 222 may update the data stored in the first sandbox 250 based on the received information at a block 356 and may also update the data stored in the shadow data component 251 based on the received information at a block 358.

However, when the first sandbox 250 is in a locked mode, the operating system 222 may store the received information for updating the data stored in the first sandbox 250 in a queue such as the lock queue 254, at a block 360. The operating system 222 may further update the data stored in the shadow data component 251 based on the received information at a block 362. As such, when the first sandbox 250 is in the locked mode and information is received by the electronic device 201 for updating data stored in the first sandbox 250, even though the first sandbox 250 is locked and not updated and the information is queued to perform the update at a later time, the shadow data component 251 is updated without undue delay so that basic information about the received information is available.

For example, a user may be using the wireless device 201 when the first sandbox 250 is currently in a locked mode. For example, the user may be using an application that only requires data stored in the second sandbox 252, such as browsing the internet, using a web browser, playing a game, or listening to music. In another example, the user may be using a hybrid application that is accessing data from the second sandbox 252 and the shadow data component 251. The user may have a business meeting soon, which is stored in the currently locked first sandbox 250. Since the first sandbox 250 is currently locked, the calendar application 297 may only be able to show the existence of the meeting and the time of the meeting and may still provide reminders of the meeting based on the subset of the data stored in the shadow data component 251. However, the organizer of the meeting may send out a cancellation that arrives from an email server. Despite the first sandbox 250 currently being locked and the cancellation being queued to update the first sandbox 250 data 227a at a later time, since the shadow data component 251 is updated without undue delay, the user may still see that the impending meeting has been cancelled.

Figure 4:
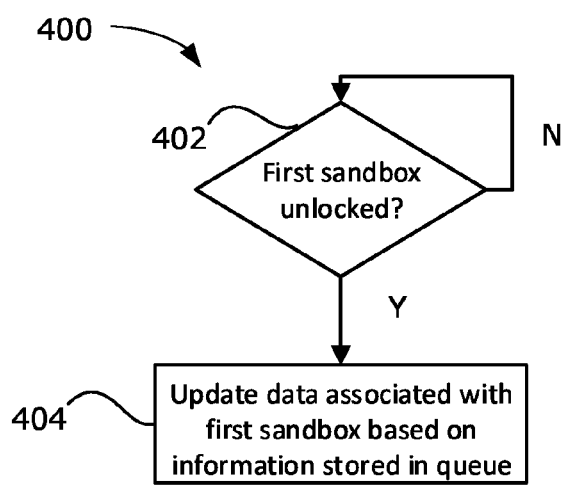
FIG. 4 illustrates a flowchart of an example method of updating data in a secure sandbox when the secure sandbox becomes unlocked.

Referring now to FIG. 4, a flowchart is showing illustrating an example method 400 of updating data in a secure sandbox when the sandbox becomes unlocked. In one example, the method 400 may be executed by an electronic 201 device having a display 204, a communication component such as the communication subsystem 211, and a memory 244 storing data in a first sandbox 250 and data in a second sandbox 252. The first sandbox 250 may be a secure sandbox having a shadow data component 251 and the shadow data component 251 may store a subset of the data stored in the first sandbox 250. The processor 240 may be coupled to the display 204, the communication component, and the memory 244. While one example of an electronic device 201 is provided for executing the method 400, any suitable computing device may be used to meet the design criteria of a particular application.

The method 400 may execute following the blocks 360 and 362 described in connection with FIG. 3 when information for updating data stored in the first sandbox 250 is currently stored in the lock queue 254.

At a block 402, the operating system 222 may wait for the first sandbox 250 to enter the unlocked mode. The security lock on the first sandbox 250 may be disengaged and the first sandbox 250 may be unlocked when the user of the wireless device 201 provides required security authentication, such as a password, facial recognition by the wireless device 102, thumbprint authentication, or any other suitable method of security authentication.

Next, at a block 404, when the first sandbox enters the unlocked mode, the data stored in the first sandbox 250 may be updated based on the information for updating the data stored in the first sandbox 250 stored in the lock queue 254. Once the data stored in the first sandbox 250 is updated, the lock queue 254 may be purged and, optionally, the shadow data component 251 may be re-checked with the new data now stored in the first sandbox 250 to ensure that the proper subset of data is stored in the shadow data component 251.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable storage medium including program instructions recorded thereon, or a computer data signal carrying computer readable program instructions may direct an apparatus to facilitate the practice of the described methods. For example, a compute readable storage medium may include computer executable instructions for performing one or more of the methods described herein. It is understood that such apparatus and articles of manufacture also come within the scope of the present application.

The term "computer readable medium" or "computer readable storage medium" as used herein means any medium which can store instructions for use by or execution by a computer or other computing device including but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various example embodiments presented above are merely examples. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An electronic device comprising:
   a display;
   a communication component;
   a memory storing first data in a first sandbox and second data in a second sandbox, the first sandbox being a secure sandbox and having a shadow data component, the shadow data component storing a subset of the first data stored in the first sandbox; and
   a processor coupled to the display, the communication component, and the memory, the processor being configured to:
   in response to a request:
   provide the first data stored in the first sandbox when the first sandbox is in an unlocked mode; and
   provide the first data stored in the shadow data component when the first sandbox is in a locked mode.

2. The electronic device according to claim 1, wherein the processor is further configured to:
   receive from a server via the communication component information for updating the first data stored in the first sandbox;
   update the first data stored in the first sandbox when the first sandbox is in the unlocked mode; and
   update the first data stored in the shadow component.

3. The electronic device according to claim 1, wherein the first sandbox further has an associated queue and the processor is further configured to:
   receive from a server via the communication component information for updating the first data stored in the first sandbox;
   store the information for updating the first data stored in the first sandbox in the queue when the first sandbox is in the locked mode; and update the first data stored in the shadow data component.

4. The electronic device according to claim 3, wherein the processor is further configured to:
update the first data stored in the first sandbox based on the information for updating the first data stored in the first sandbox stored in the queue when the first sandbox enters the unlocked mode.

5. The electronic device according to claim 1, wherein both the first sandbox and the second sandbox are controlled exclusively by a single operating system, the first data stored in the first sandbox is encrypted, and the first data stored in the shadow data component is a redundant subset of the first data stored in the first sandbox.

6. The electronic device according to claim 1, wherein the electronic device displays an update on the display using the first data stored in the shadow data component when the first sandbox is in the locked mode.

7. The electronic device according to claim 6, wherein the update is selected from the group consisting of a calendar reminder, an email notification, and a contact list entry.

8. The electronic device according to claim 3, wherein an element of the first data that is stored in both the first sandbox and the shadow data component is associated by a first identifier and an element of the first data that is stored in both the queue and the shadow data component is associated by a second identifier.

9. The electronic device according to claim 1, wherein when the first sandbox is in the locked mode, all of the first data stored in the first sandbox is inaccessible except for first data stored in a start-up area of the first sandbox until access to the first sandbox is authenticated and wherein the shadow data component is stored in the start-up area.

10. A method for use on an electronic device having a display, a communication component, a memory storing first data in a first sandbox and second data in a second sandbox, the first sandbox being a secure sandbox and having a shadow data component, the shadow data component storing a subset of the first data stored in the first sandbox, and a processor coupled to the display, the communication component, and the memory, the method comprising:
in response to a request:
providing the first data stored in the first sandbox when the first sandbox is in an unlocked mode; and
providing the first data stored in the shadow data component when the first sandbox is in a locked mode.

11. The method according to claim 10, further comprising:
receiving from a server via the communication component information for updating the first data stored in the first sandbox;
updating the first data stored in the first sandbox when the first sandbox is in the unlocked mode; and
updating the first data stored in the shadow component.

12. The method according to claim 10, wherein the first sandbox further has an associated queue, the method further comprising:

receiving from a server via the communication component information for updating the first data stored in the first sandbox;
storing the information for updating the first data stored in the first sandbox in the queue when the first sandbox is in the locked mode; and
updating the first data stored in the shadow data component.

13. The method according to claim 12, further comprising:
updating the first data stored in the first sandbox based on the information for updating the first data stored in the first sandbox stored in the queue when the first sandbox enters the unlocked mode.

14. The method according to claim 10, wherein both the first sandbox and the second sandbox are controlled exclusively by a single operating system, the first data stored in the first sandbox is encrypted, and the first data stored in the shadow data component is a redundant subset of the first data stored in the first sandbox.

15. The method according to claim 10, further comprising displaying an update on the display using the first data stored in the shadow data component when the first sandbox is in the locked mode.

16. The method according to claim 15, wherein the update is selected from the group consisting of a calendar reminder, an email notification, and a contact list entry.

17. The method according to claim 12, wherein an element of first data that is stored in both the first sandbox and the shadow data component is associated by a first identifier and an element of first data that is stored in both the queue and the shadow data component is associated by a second identifier.

18. The method according to claim 10, wherein when the first sandbox is in the locked mode, all of the first data stored in the first sandbox is inaccessible except for first data stored in a start-up area of the first sandbox until access to the first sandbox is authenticated and wherein the shadow data component is stored in the start-up area.

19. A computer program product comprising a non-transitory computer readable medium having stored thereon computer executable instructions that when executed by a computer perform a method for use on the computer having a display, a communication component, a memory storing first data in a first sandbox and second data in a second sandbox, the first sandbox being a secure sandbox and having a shadow data component, the shadow data component storing a subset of the first data stored in the first sandbox, and a processor coupled to the display, the communication component, and the memory, the method comprising:
in response to a request:
providing the first data stored in the first sandbox when the first sandbox is in an unlocked mode; and
providing the first data stored in the shadow data component when the first sandbox is in a locked mode.

* * * * *